(12) United States Patent
Wei et al.

(10) Patent No.: US 9,158,798 B2
(45) Date of Patent: Oct. 13, 2015

(54) DATABASE LARGE OBJECT REORGANIZATION

(75) Inventors: Ke Wei Wei, Beijing (CN); Shuo Wu, Beijing (CN); Xin Ying Yang, Beijing (CN); Xiang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/463,870

(22) Filed: May 4, 2012

(65) Prior Publication Data

US 2013/0117332 A1 May 9, 2013

(30) Foreign Application Priority Data

Aug. 31, 2011 (CN) .......................... 2011 1 0254002

(51) Int. Cl.
*G06F 17/30* (2006.01)

(52) U.S. Cl.
CPC .... *G06F 17/30292* (2013.01); *G06F 17/30318* (2013.01)

(58) Field of Classification Search
CPC .............................................. G06F 17/30318
USPC ........................................................ 707/803
See application file for complete search history.

(56) References Cited

U.S. PATENT DOCUMENTS

| | | |
|---|---|---|
| 6,144,970 A | 11/2000 | Bonner et al. |
| 6,535,895 B2 | 3/2003 | Bonner et al. |
| 7,181,481 B2 | 2/2007 | Chen et al. |
| 7,447,717 B2 | 11/2008 | Bower et al. |
| 7,853,619 B2 | 12/2010 | Yu et al. |
| 2005/0086269 A1 | 4/2005 | Chen et al. |
| 2006/0047670 A1* | 3/2006 | Yu et al. .......................... 707/100 |
| 2008/0114780 A1 | 5/2008 | Man et al. |
| 2009/0157985 A1* | 6/2009 | Stevens et al. ................. 711/154 |
| 2009/0240711 A1* | 9/2009 | Levin .............................. 707/100 |
| 2010/0145942 A1 | 6/2010 | Stork et al. |
| 2010/0205157 A1 | 8/2010 | Hanus et al. |

FOREIGN PATENT DOCUMENTS

CN 101080715 A 2/2015

OTHER PUBLICATIONS

Rajinder Gill, Everything You Always Wanted to Know About SDRAM (Memory): But Were Afraid to Ask, Aug. 15, 2010, AnandTech, pp. 1-6.*

* cited by examiner

*Primary Examiner* — Apu Mofiz
*Assistant Examiner* — Dara J Glasser
(74) *Attorney, Agent, or Firm* — Cantor Colburn LLP

(57) ABSTRACT

Embodiments of the invention relate to database large object (LOB) reorganization. An aspect of the invention includes calculating an activity of an inline LOB. The length of an inline LOB is redefined according to the activity of the inline LOB. LOB reorganization is performed based on the redefined length of the inline LOB.

10 Claims, 6 Drawing Sheets

US 9,158,798 B2

DATABASE LARGE OBJECT REORGANIZATION

PRIORITY

The present application claims priority to Chinese Patent Application No. 201110254002.X, filed Aug. 31, 2011, the contents of which herein incorporated by reference in its entirety, with all benefits accruing therefrom under 35 U.S.C. §119.

BACKGROUND

Large object (LOB) is a data type, including the following three types: the binary large object (BLOB) data type, which is used to store binary data such as an image; the character large object (CLOB) data type, which is used to store character data, such as a text file; and the double byte character large object (DBCLOB) data type, which is used to store double-byte character data. A stored object corresponding to the LOB data type may be a very large image or file, and therefore, compared with other data types, the LOB data type has special storage requirements.

Because the size of a LOB is usually very large, larger even than the maximum database row size, a group of LOBs cannot be stored together using basic row based database storage schemes. To solve this problem, databases, such as DB2® for example, store a LOB in a specific LOB table space, and a LOB descriptor is stored in the database row. The LOB descriptor points to the storage position of the LOB in the LOB table space. In some instances, however, the size of a LOB may be small. The smaller sized LOB may be stored in a database table directly, which provides increased data access performance when accessing the LOB. This method of storing smaller LOBs is called the inline LOB technique.

SUMMARY

Embodiments include a method, system and computer program product for database large object (LOB) reorganization. An activity of an inline LOB is calculated. The length of the inline LOB is redefined according to the activity of the inline LOB. LOB reorganization is performed based on the redefined length of the inline LOB.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

A database system optimizes performance using a reorganization operation. For an inline LOB, current reorganization techniques do not take into account LOB related factors that affect database performance. This often results in the reorganization operation having a reduced impact on database performance, and may sometimes result in the reduction of database performance.

Figure 1:
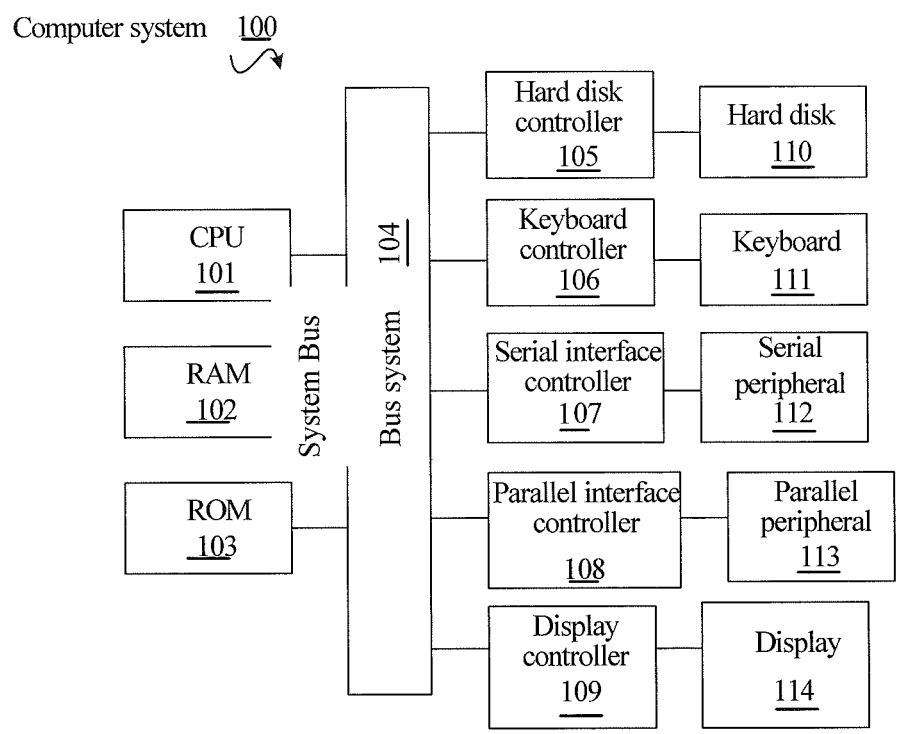
FIG. 1 illustrates a block diagram of a computer system for large object (LOB) reorganization in an embodiment.

FIG. 1 is a schematic diagram of a computer system 100 in accordance with an embodiment. The computer system 100 shown in FIG. 1 includes a central processing unit (CPU) 101, a random access memory (RAM) 102, read-only memory (ROM) 103, a system bus 104, a hard disk controller 105, a keyboard controller 106, a serial interface controller 107, a parallel interface controller 108, a display controller 109, a hard disk 110, a keyboard 111, a serial peripheral device 112, a parallel peripheral device 113 and a display 114. In an embodiment, the CPU 101, the RAM 102, the ROM 103, the hard disk controller 105, the keyboard controller 106, the serial interface controller 107, the parallel interface controller 108 and the display controller 109 are in communication with the system bus 104. The hard disk 110 is in communication with the hard disk controller 105; the keyboard 111 is in communication with the keyboard controller 106; the serial peripheral device 112 is in communication with the serial interface controller 107; the parallel peripheral device 113 is in communication with the parallel interface controller 108; and the display 114 is in communication with the display controller 109. It will be understood that the block diagram of FIG. 1 is used for clarity, and is not meant to be limiting. In other embodiments, additional devices may be added or devices shown in FIG. 1 may be removed as required by specified conditions.

Because current reorganization for inline large objects (LOBs) does not consider factors affecting the database performance, such as the database environment and the granularity of database operations, reorganization often results in no substantial increase of database performance. An embodiment of the present invention takes into account the database environment, and the granularity of database operations when performing reorganization by introducing the activities of inline LOBs, and therefore enhances the performance increases that reorganization can typically bring to the database.

According to embodiments described herein, the following data columns are introduced into a database table with inline LOBs:

Inline LOB hit counter: The inline LOB hit counter corresponds to each inline LOB in each data row in the data table. When an inline LOB is accessed during a reorganization, the value of the inline LOB hit counter corresponding to that inline LOB increases by 1.

Data row hit counter: The data row hit counter corresponds to each data row in the data table. When a data row is accessed during a reorganization, the data row hit counter corresponding to that data row increases by 1.

Data page hit counter: The data page hit counter corresponds to each data page in the data table. When a data page is accessed during the reorganization the data page hit counter corresponding to that data page increases by 1.

Figure 4A:
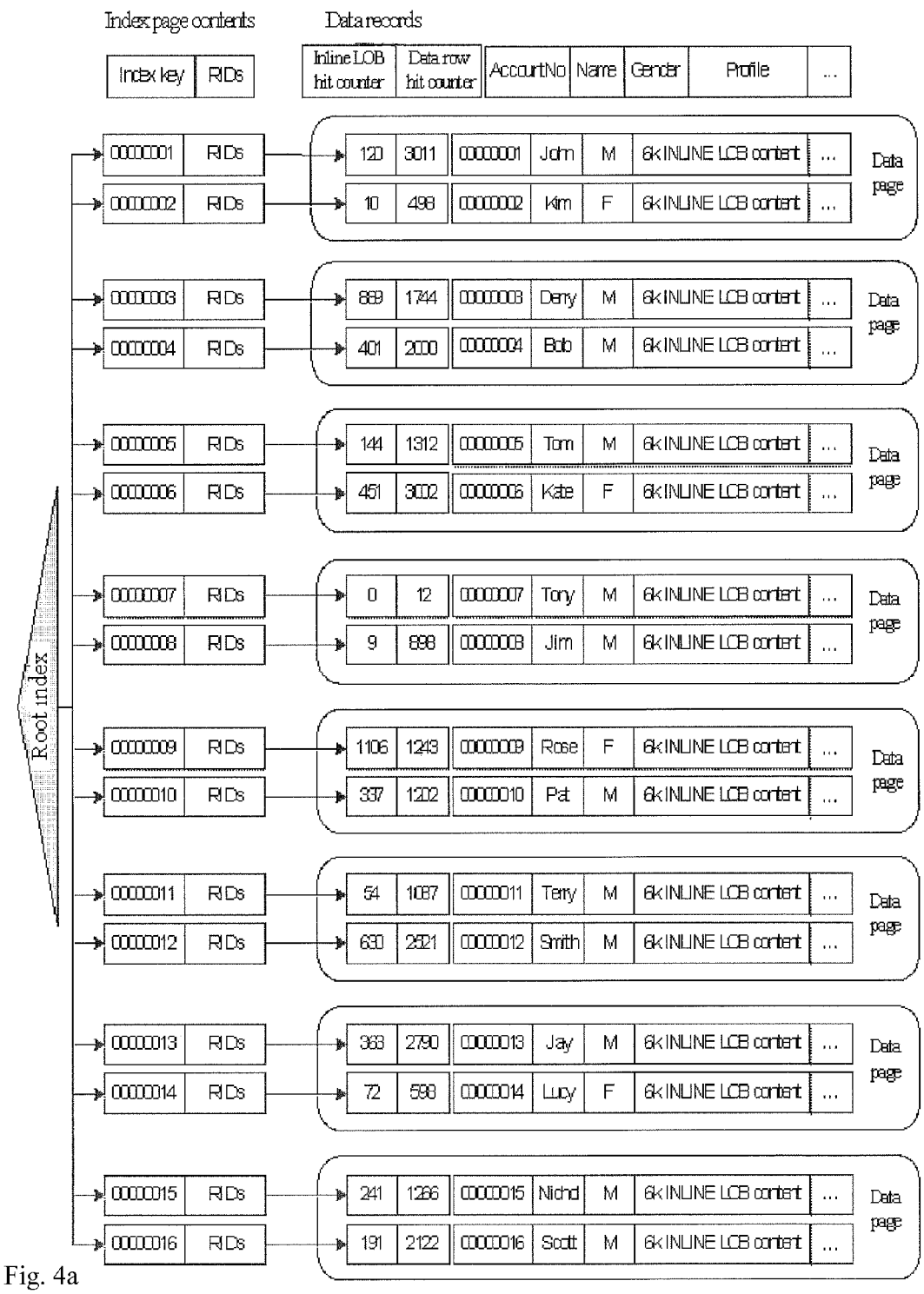
FIGS. 4a-4c illustrate the organization of LOBs according to an embodiment.
Figure 4B:
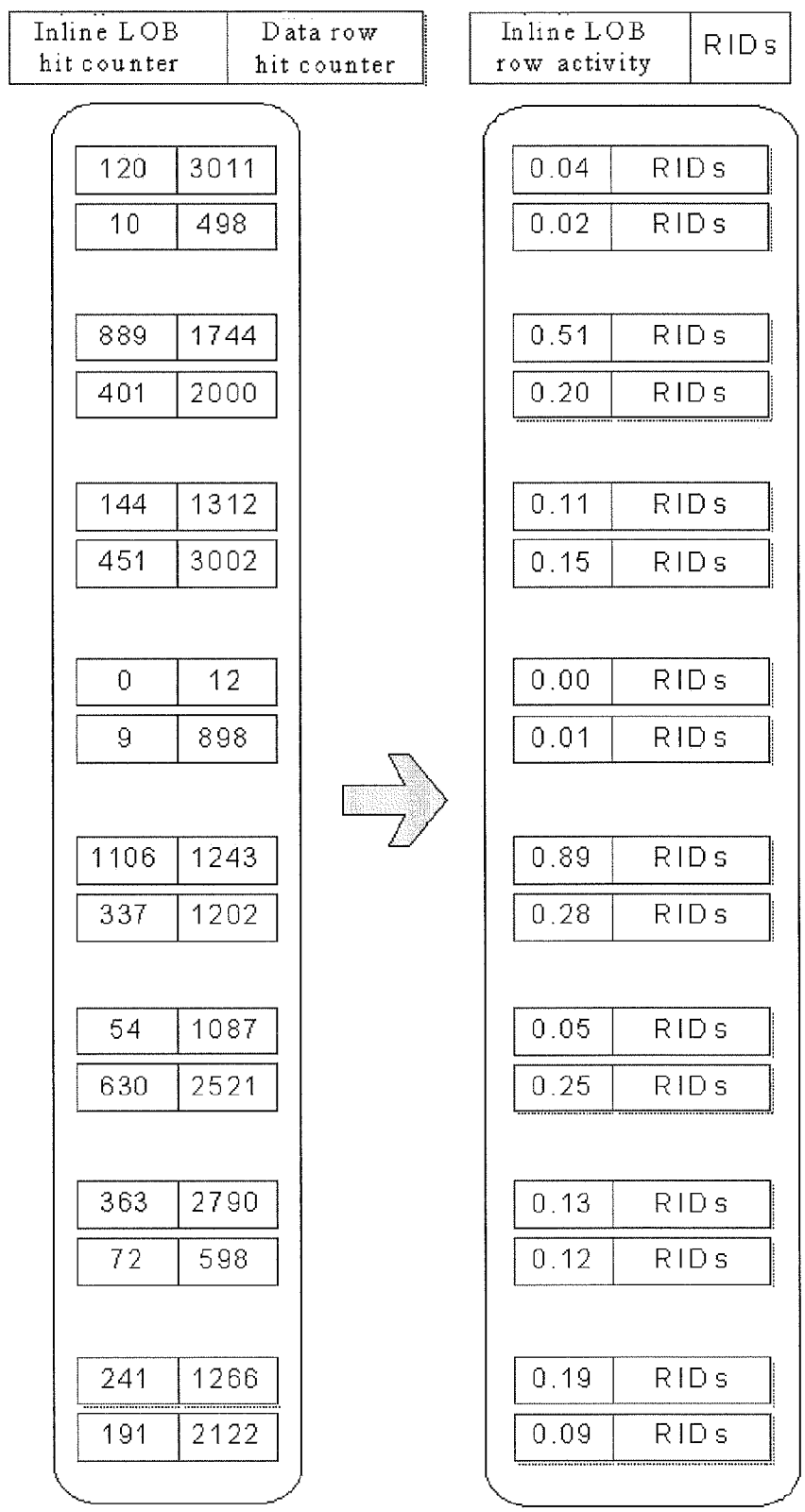
Figure 4C:
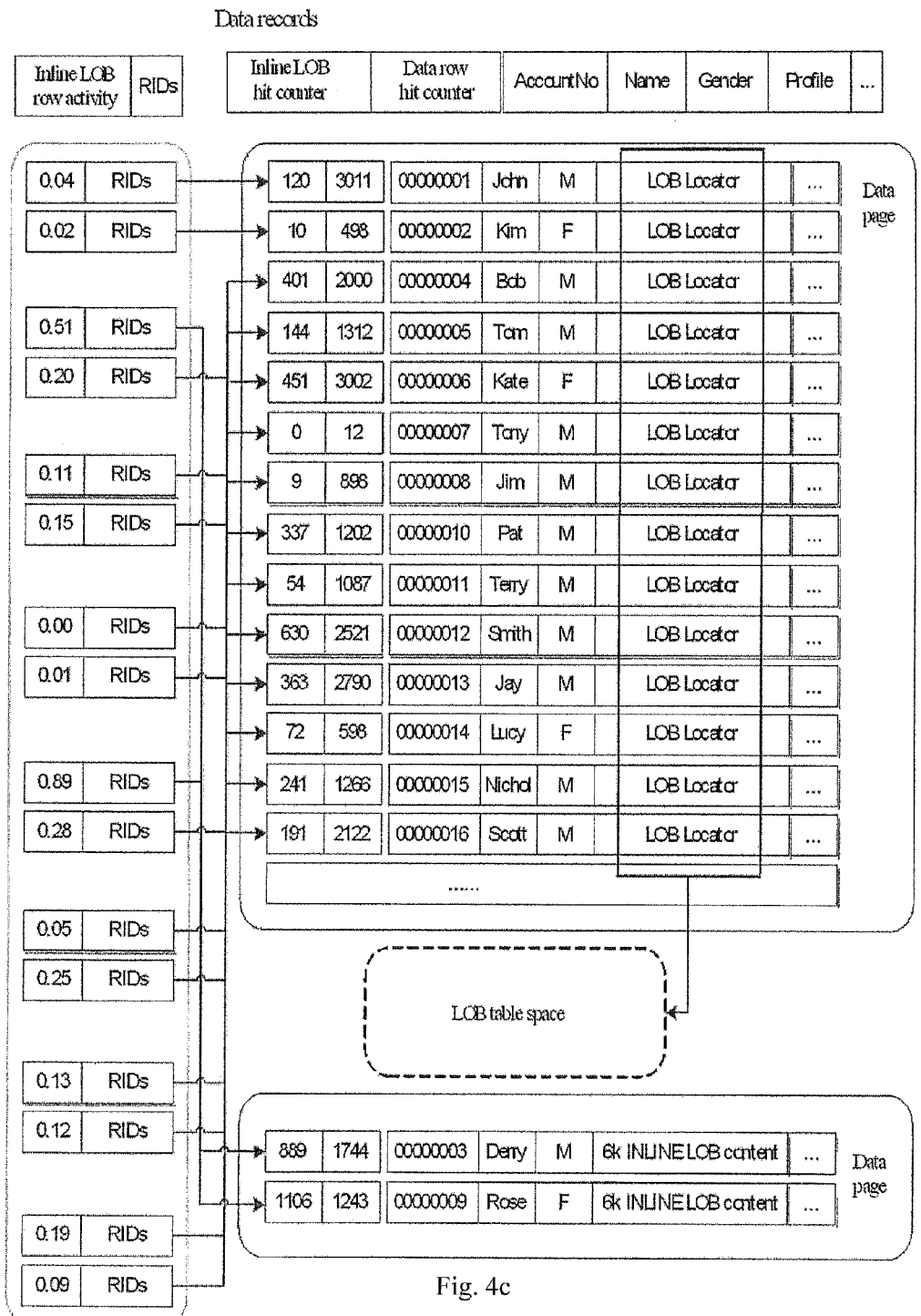

FIGS. 4a, 4b, and 4c depict examples of using the inline LOB hit counter and the data row hit counter in a data table with inline LOBs in an embodiment.

The inline LOB hit counter is used in each data table in the database. In an embodiment, the data row hit counter and the data page hit counter are both added, along with the inline LOB hit counter to each data table. In an additional embodiment, only the data row hit counter or the data page hit counter is added to the data table along with the inline LOB hit counter. The database engine monitors the hits and updates the inline LOB counter, data row counter and/or data page counter as they are accessed.

Figure 2:
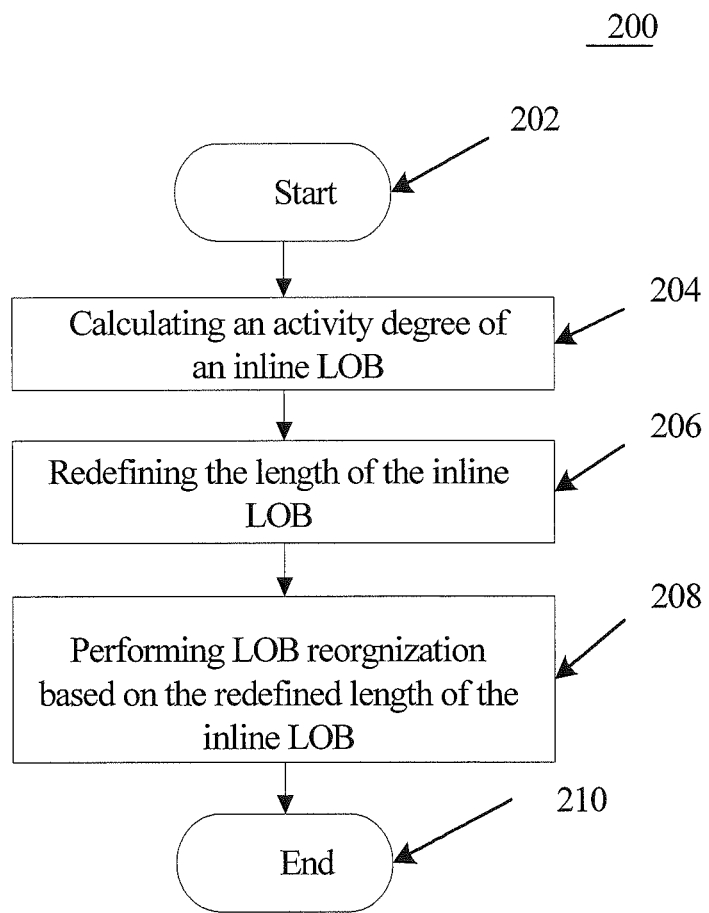
FIG. 2 illustrates a flow diagram of database LOB reorganization according to an embodiment.

FIG. 2 depicts a flow diagram of a method 200 for database LOB reorganization according to an embodiment. At block 202, the database LOB reorganization starts.

At block 204, an activity degree of an inline LOB is calculated. According to an embodiment, the activity degree of an inline LOB includes a row activity of the inline LOB. The row activity of an inline LOB is calculated using the number of times the inline LOB has been accessed, and the number of times that the data row in which the inline LOB is located is accessed over a single period of time. For example, the row activity of an inline LOB equals the number of times that the inline LOB has been accessed/the number of times that the data row in which the inline LOB is located has been accessed over a period of time.

According to an additional embodiment of the present disclosure, the activity degree of an inline LOB includes the page activity of the inline LOB. The page activity of an inline LOB is calculated using the number of times that the inline LOB has been accessed and the number of times that the data page in which the inline LOB is located has been accessed over a period of time. For example, the page activity of an inline LOB equals the number of times that the inline LOB has been accessed/the number of times that the data page in which the inline LOB is located has been accessed over a period of time.

The row activity and the page activity of an inline LOB represent the activity of the inline LOB using different granularities (i.e., from the perspectives of the data row and the data page respectively). The row activity of an inline LOB is the probability of the inline LOB being accessed when the row in which it is located is accessed. The page activity of an inline LOB is the probability of the inline LOB being accessed when the page in which it is located is accessed.

At block 206, the length of the inline LOB is redefined according to the activity degree of the inline LOB. In an embodiment, the length of the inline LOB is redefined by determining if the row activity of the inline LOB exceeds a predetermined threshold. If the row activity of the inline LOB does not exceed the predetermined threshold, the length of the inline LOB is redefined to zero. The predetermined threshold is set by the database administrator based on experience, or may be set based on the number of times the inline LOB and data row are accessed. The monitoring of inline LOB and data row access may be performed by the database engine. If the row activity of an inline LOB does not exceed the predetermined threshold, (i.e., the probability of the inline LOB being accessed does not exceed the predetermined threshold), then the inline LOB is removed from the data row by redefining the length of the inline LOB to zero, and storing the inline LOB in a separate LOB table space, which enhances database performance.

In an embodiment, redefining the length of the inline LOB according to the activity of the inline LOB is performed by calculating the row activities of the inline LOBs, sorting the row activities of the inline LOBs, determining if the sorted position of the row activity of an inline LOB meets a specified condition, and if the specified condition is met, redefining the length of the inline LOB to 0. According to an embodiment, the row activities of the LOBs are sorted in descending order, and the specified condition is that the sorted position is no less than a predetermined value. According to another embodiment, the row activities of the LOBs are sorted in ascending order, and the specified condition is that the sorted position is not greater than a predetermined value. The predetermined value may be set by the database administrator based on experience, or may be set based on monitoring the number of the LOBs, data row or data page accesses by the database engine. If the row activities of the of inline LOBs are sorted in descending order, and the specified condition is that the sorted position is not less than a predetermined value, and if the row activity of an inline LOB is not less than the predetermined value, then the inline LOB is removed from the data row (i.e., the length of the inline LOB is redefined to 0) and the LOB is stored in a separate LOB table space, which enhances database performance. Similarly, if the inline LOBs are sorted in ascending order, and the specified condition is that the sorted position is not greater than a predetermined value, and if the row activity of the inline LOB is no greater than the predetermined value, then the inline LOB is removed from the data row (i.e., the length of the inline LOB is redefined to 0) and the LOB is stored in a separate LOB table space, which enhances database performance.

After the inline LOB is removed from the data row and stored in the separate LOB table space, an indicator corresponding to the LOB is inserted at the original position of the LOB. The indicator points to the position of the LOB in the LOB table space. The database engine is modified in order to be able to identify, while performing normal database operations, whether a row data includes the LOB itself, or an indicator corresponding to the LOB.

According to an embodiment, the length of the inline LOB is redefined according to the activity of the inline LOB by determining whether the page activity of the inline LOB exceeds a predetermined threshold. If the page activity of the inline LOB does not exceed the predetermined threshold, the length of the inline LOB is set to zero. The predetermined threshold may be set by the database administrator based on experience, or it may be set based on monitoring the number of times the inline LOB and data page are accessed by the database engine. If the page activity of an inline LOB does not exceed the predetermined threshold, that is, the probability of the inline LOB being accessed does not exceed the predetermined threshold, then removing the inline LOB from the data page (i.e., redefining the length of the inline LOB to zero), and storing it in a separate LOB table space, may be more conducive to enhancing the database performance.

According to an embodiment, the length of the inline LOB may be redefined based on the activity of the LOB. The page activity of the inline LOBs is calculated and the page activities of the inline LOBs are sorted by page activity. The sorted position of the page activity of an inline LOB is compared to a specified condition, and if the sorted position of the page activity of the inline LOB meets the specified condition, the length of the inline LOB is set to zero. According to an embodiment, the page activities of the LOBs are sorted in descending order, and the specified condition is that the sorted position is no less than a predetermined value. According to an additional embodiment, the page activities of the LOBs are sorted in ascending order, and the specified condition is that the sorted position is no greater than a predetermined value. The predetermined value may be set by the database administrator based on experience, or may be based on the results of monitoring the number of times that the LOBs and data pages have been accessed by the database engine. If the inline LOBs are sorted in descending order, and the specified condition is that the sorted position is no less than a predetermined value, and if the page activity of an inline LOB is no less than the predetermined value, then the inline LOB is removed from the data page (i.e., the length of the inline LOB is redefined to zero) and the LOB is stored in a separate LOB table space, which enhances the database performance. Similarly, if the inline LOBs are sorted in ascending order, the specified condition is that the sorted position is no greater than a predetermined value, and if the page activity of an inline LOB is no greater than the predetermined value, then the inline LOB is removed from the data page (i.e., the length of the inline LOB is redefined to zero) and the LOB is stored it in a separate LOB table space, which enhances database performance.

At block 208, LOB reorganization is performed based on the redefined length of the inline LOB. Each of the inline LOBs whose size has been redefined to zero is removed from the data rows or data pages. Existing techniques may be used to perform the reorganization based on the redefined lengths of the inline LOBs. At block 210, processing ends.

Figure 3:
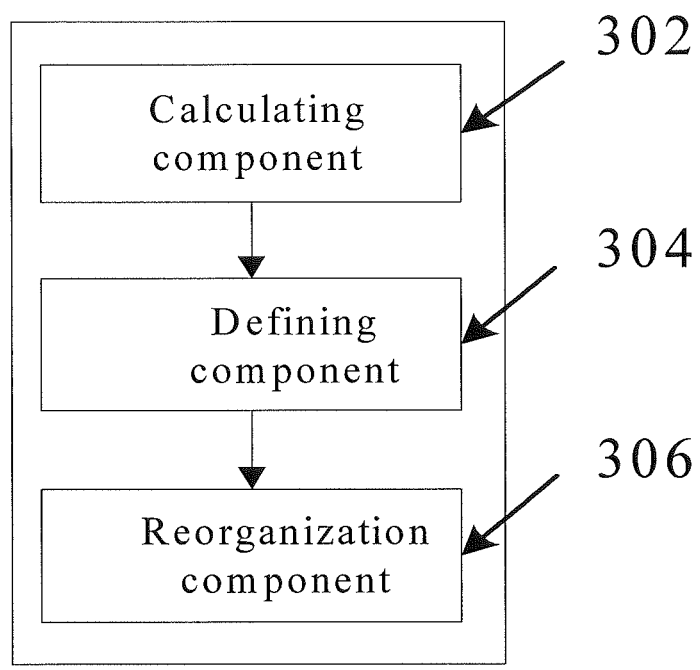
FIG. 3 illustrates a system for database LOB reorganization according to an embodiment.

FIG. 3 depicts a system 300 for database LOB reorganization according to an embodiment. The system 300 includes a calculating component 302 configured to calculate an activity of an inline LOB. The system 300 additionally includes a defining component 304 configured to redefine the length of the inline LOB according to the activity of the inline LOB. The system 300 further includes a reorganization component 306 configured to perform LOB reorganization based on the redefined length of the inline LOB.

According to an embodiment, the activity of an inline LOB includes the row activity of the inline LOB. The calculating component 302 calculates the row activity of an inline LOB using the number of times the inline LOB has been accessed and the number of times that the data row in which the inline LOB is located has been accessed over a period of time. The row activity of an inline LOB is the number of times the inline LOB has been accessed divided by the number of times the data row in which the inline LOB is located is accessed over a period of time.

According to another embodiment, the activity of an inline LOB includes the page activity of the inline LOB. The page activity of an inline LOB is calculated by determining the number of times the inline LOB has been accessed and the number of times that the data page in which the inline LOB is located is accessed. The page activity of an inline LOB is the number of times that the inline LOB has been accessed divided by the number of times that the data page in which the inline LOB is located has been accessed over a period of time.

According to an embodiment, the system 300 for database LOB reorganization includes a determining component (not shown) that is configured to determine whether the row activity of the inline LOB exceeds a predetermined threshold. The defining component 304 redefines the length of the inline LOB to zero if the row activity of the inline LOB does not exceed the predetermined threshold.

According to an embodiment, the calculating component 302 additionally calculates the row activities of the inline LOBs, and the system 300 additionally includes a sorting component (not shown) that sorts the row activities of the inline LOBs. The system 300 also includes a determining component (not shown) that determines if the sorted position of the row activity of an inline LOB meets a specified condition. The defining component 304 redefines the LOB to zero if the sorted position of the row activity of the inline LOB meets the specified condition. According to an embodiment, the row activities of the plurality of LOBs are sorted in descending order, and the specified condition is that the sorted position is no less than a predetermined value. According to another embodiment, the row activities of the LOBs are sorted in ascending order, and the specified condition is that the sorted position is no greater than a predetermined value. The predetermined value may be set by the database administrator based on experience, or based on the monitoring the number of times that the LOBs, data rows or data pages have been accessed by the database engine. If the inline LOBs are sorted in descending order, and the specified condition is that the sorted position is no less than a predetermined value, and the row activity of an inline LOB is no less than the predetermined value, then the inline LOB is removed from the data row (i.e., the length of the inline LOB is redefined to zero), and the inline LOB is stored in a separate LOB table space that enhances database performance. If the plurality of inline LOBs are sorted in ascending order, and the specified condition is that the sorted position is no greater than a predetermined value, and if the row activity of an inline LOB is no greater than the predetermined value, then the inline LOB is removed from the data row (i.e., the length of the inline LOB is redefined to zero), and the inline LOB is stored in a separate LOB table space that enhances database performance.

According to an embodiment, the system 300 for database LOB reorganization additionally includes a determining component (not shown) that determines whether the page activity of the inline LOB exceeds a predetermined threshold, and if the page activity of the inline LOB does not exceed the predetermined threshold, redefines the length of the inline LOB as zero.

According to an embodiment, the calculating component 302 additionally calculates the page activities of the inline LOBs, and the system 300 additionally includes a sorting component (not shown) that sorts the page activities of the inline LOBs. The system 300 additionally includes a determining component (not shown) that determines whether the sorted position of the page activity of an inline LOB meets a specified condition. The defining component 304 additionally redefines the length of the inline LOB to zero if the sorted position of the page activity of the inline LOB meets the specified condition. According to an embodiment, the page activities of the plurality of LOBs are sorted in descending order, and the specified condition is that the sorted position is no less than a predetermined value. According to another embodiment, the page activities of the inline LOBs are sorted in ascending order and the specified condition is that the sorted position is no greater than a predetermined value. The predetermined value may be set by the database administrator based on experience, or may be based on monitoring how many times the inline LOBs, data pages have been accessed by the database engine. If the inline LOBs are sorted in descending order, and the specified condition is that the sorted position is no less than a predetermined value, and if the page activity of an inline LOB is not less than the predetermined value, then the inline LOB is removed from the data page (i.e, the length of the inline LOB is redefined to zero) and the inline LOB is stored in a separate LOB table space that enhancing the database performance. Similarly, if the inline LOBs are sorted in ascending order, and the specified condition is that the sorted position is no greater than a predetermined value, and the page activity of an inline LOB is no greater than the predetermined value, then the inline LOB is removed from the data page (i.e., the length of the inline LOB is redefined to zero) and the inline LOB is stored in a separate LOB table space that enhances the database performance.

An embodiment will be described in detail below with reference to FIGS. 4a-4c. FIG. 4a depicts data organized in a database before performing the inline LOB reorganization according to an embodiment. Eight data pages are represented, and each data page includes two data rows. The first column and the second column of each data row are the inline LOB hit counter and data row hit counter respectively.

FIG. 4b depicts the fields used to perform inline LOB reorganization. The row activity of each inline LOB is calculated based on the contents of the inline LOB hit counter (the first column of each data row) and the data row hit counter (the second column of each data row) of each data row. The left side table of FIG. 4b depicts the contents of the first column and the second column of each data row in each data page, and the right side table of FIG. 4b depicts the row activity of the inline LOB corresponding to each data row. The inline LOB row activity is calculated based on the contents of the first column and the second column of each data row (i.e., the row identifier (RID) and the row activity of the inline LOB corresponding to the RID).

According to an embodiment, the row activity of the inline LOB is compared to a predetermined threshold, and if the row activity of the inline LOB does not exceed the predetermined threshold, then the length of the inline LOB is redefined as zero. Returning to FIG. 4b, if the predetermined threshold is 0.5, the row activity of each inline LOB is compared with the predetermined threshold (i.e., 0.5). The lengths of those inline LOBs whose length does not exceed 0.5 are redefined to zero. In performing inline LOB reorganization, those inline LOB whose length does not exceed 0.5 are removed from the rows in which they are located, and they are stored in a LOB table space. Indicators pointing to the positions where the LOBs were placed in the LOB table space are stored at the positions in the row where the LOBs were originally stored. The results of the reorganization performed on the example of FIG. 4a are depicted in FIG. 4c.

According to an embodiment, the row activities of the inline LOBs are calculated and sorted. If the sorted position of the row activity of the inline LOB meets a specified condition, the length of the inline LOB is redefined to zero. According to an embodiment, the row activities of the LOBs are sorted in descending order, and the specified condition is that the sorted position is no less than a predetermined value. Referring to FIG. 4b, assuming the predetermined value is 6, if the sorted position of the row activity of an inline LOB is no less than 6, the length of the inline LOB is redefined to zero. Those inline LOBs for which the sorted positions are no less than 6 are removed from the rows where they are located, and are stored in the LOB table space. Indicators pointing to the positions where the LOBs were placed in the LOB table space are stored at the positions in the row where the LOBs were originally stored.

The terminology used herein is for the purpose of describing particular embodiments only and is not intended to be unduly limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the form disclosed. Many modifications and variations will be apparent to those of ordinary skill in the art. The embodiment was chosen and described in order to best explain the principles and the practical application, and to enable others of ordinary skill in the art to understand various embodiments of the invention with various modifications as are suited to the particular use contemplated.

The method and system according to embodiments of the present invention have been described above. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer readable signal medium may include a propagated data signal with the computer-usable program code embodied therewith, either in baseband or as part of a carrier wave. The propagated signal can be in various forms, including but not limited to, electromagnetic signals, optical signals, or any suitable combination of the foregoing. The computer readable signal medium may be any computer readable medium that is not a computer readable storage medium, but that may transmit, propagate or transport a program for use by or in connection with an instruction execution system, apparatus or device.

The program code embodied in the computer readable medium may be transmitted using any appropriate medium, including but not limited to wireless, wired, optical fiber cable, RF, etc, or any suitable combination of the foregoing.

Computer program code for carrying out operations in embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is also to be noted that in the apparatus and methods of the present disclosure, the components or steps can obviously be decomposed and/or recombined. These decomposition and/or recombination should be deemed equivalent solutions of the present disclosure. The processing steps may be performed naturally in the time order according to the order of the description, but may not necessarily be performed in the time order. Some steps may be performed in parallel or independent of each other.

Although the present disclosure and advantages thereof have been described in detail, it will be understood that various changes, substitution and transformation may be made thereto without departing from the spirit and scope of the present disclosure. Further, the terms "comprises", "comprising," or any variants thereof are intended to cover nonexclusive inclusion, such that a process, method, article or apparatus comprising a series of elements may not only comprise those elements, but may also comprise other elements, or may also comprise elements inherent to the process, method, article or apparatus. Without further limitation, an element defined by the phrase "comprising a" does not preclude the presence of other identical elements in the process, method, article or apparatus comprising the element.

The invention claimed is:

1. A method for database large object (LOB) reorganization, comprising:
    calculating, by a computer, an activity of an inline LOB, wherein the activity of the inline LOB is calculated by dividing an inline LOB hit counter, which is a number of times that the inline LOB has been accessed during a time period, by a data row hit counter, which is calculated using the number of times a data row of the inline LOB has been accessed over the period of time, or a data page hit counter, which is calculated using the number of times a data page of the inline LOB has been accessed over the period of time;
    redefining a length of the inline LOB according to the activity of the inline LOB by determining whether the activity of the inline LOB exceeds a predetermined threshold and in response to determining that the activity of the inline LOB does not exceed the predetermined threshold, redefining the length of the inline LOB as zero;
    based on determining that the length of the inline LOB has been redefined to zero:
        storing the inline LOB in a separate LOB table space; and
        inserting an indicator corresponding to the inline LOB at an original position of the inline LOB, wherein the indicator points to a position of the inline LOB in the separate LOB table space; and
    performing LOB reorganization based on the redefined length of the inline LOB.

2. The method of claim 1, wherein redefining the length of the inline LOB according to the activity of the inline LOB comprises:
    calculating row activities of a plurality of inline LOBs;
    sorting the row activities of the plurality of inline LOBs;
    determining whether a sorted position of the row activity of an inline LOB of the plurality of inline LOBs meets a specified condition; and
    in response to determining that the sorted position of the row activity of the inline LOB meets the specified condition, redefining the length of the inline LOB to zero.

3. The method of claim 1, wherein redefining the length of the inline LOB according to the activity of the inline LOB comprises:
    calculating page activities of a plurality of inline LOBs;
    sorting the page activities of the plurality of inline LOBs;
    determining whether a sorted position of the page activity of an inline LOB in the plurality of inline LOBs meets a specified condition; and
    in response to determining that the sorted position of the page activity of the inline LOB meets the specified condition, redefining the length of the inline LOB as zero.

4. A system having a processor for database large object (LOB) reorganization, comprising:
    a calculating component configured to calculate an activity of an inline LOB, wherein the activity of the inline LOB is calculated by dividing an inline LOB hit counter, which is a number of times that the inline LOB has been accessed over a period of time, by a data row hit counter, which is calculated using the number of times a data row of the inline LOB has been accessed over the period of time, or a data page hit counter, which is calculated using the number of times a data page of the inline LOB has been accessed over the period of time;
a defining component configured to redefine a length of the inline LOB according to the activity of the inline LOB by determining whether the activity of the inline LOB exceeds a predetermined threshold and in response to determining that the activity of the inline LOB does not exceed the predetermined threshold, redefining the length of the inline LOB as zero; and
a reorganization component configured to perform LOB reorganization based on the redefined length of the inline LOB,
wherein the defining component is further configured to:
store the inline LOB in a separate LOB table space; and
insert an indicator corresponding to the inline LOB at an original position of the inline LOB based on determining that the length of the LOB has been redefined to zero, wherein the indicator points to a position of the inline LOB in the separate LOB table space.

5. The system of claim 4, wherein the calculating component is further configured to calculate row activities of a plurality of inline LOBs, and the system further comprises:
a sorting component configured to sort the row activities of the plurality of inline LOBs; and
a determining component configured to determine whether a sorted position of the row activity of an inline LOB in the plurality of inline LOBs meets a specified condition;
wherein the defining component is further configured to redefine the length of the inline LOB to zero in response to determining that the sorted position of the row activity of the inline LOB meets the specified condition.

6. The system of claim 4, wherein the calculating component is further configured to calculate page activities of a plurality of inline LOBs, and the system further comprises:
a sorting component configured to sort the page activities of the plurality of inline LOBs; and
a determining component configured to determine whether a sorted position of the page activity of an inline LOB in the plurality of inline LOBs meets a specified condition;
wherein the defining component is further configured to redefine the length of the inline LOB to zero, in response to the sorted position of the page activity of the inline LOB meeting the specified condition.

7. A computer program product for database large object (LOB) reorganization, comprising:
a non-transitory computer readable storage medium;
a first program instruction to calculate an activity of an inline LOB by dividing an inline LOB hit counter, which is a number of times that the inline LOB has been accessed during a time period, by a data row hit counter, which is calculated using the number of times a data row of the inline LOB has been accessed over the period of time, or a data page hit counter, which is calculated using the number of times a data page of the inline LOB has been accessed over the period of time;
a second program instruction to redefine a length of the inline LOB by determining whether the activity of the inline LOB exceeds a predetermined threshold and in response to determining that the activity of the inline LOB does not exceed the predetermined threshold, redefining the length of the inline LOB as zero;
a fourth program instruction to store the inline LOB in a separate LOB table space and insert an indicator corresponding to the inline LOB at an original position of the inline LOB based on determining that the length of the LOB has been redefined to zero, wherein the indicator points to a position of the inline LOB in the separate LOB table space; and
a third program instruction to perform LOB reorganization based on the redefined length of the inline LOB, wherein the first, second, third, and fourth program instructions are stored on the computer readable storage medium.

8. The computer program product of claim 7, wherein the first program instruction additionally calculates row activities of a plurality of inline LOBs, and the computer program product further comprises:
a fifth program instruction, stored on the computer readable storage medium, to sort the row activities of the plurality of inline LOBs; and
a sixth program instruction, stored on the computer readable storage medium, to determine whether a sorted position of the row activity of an inline LOB in the plurality of inline LOBs meets a specified condition;
wherein the second program instruction additionally redefines the length of the inline LOB to zero in response to determining that the sorted position of the row activity of the inline LOB meets the specified condition.

9. The computer program product of claim 7, wherein the first program instruction calculates the page activity of the inline LOB using a number of times the inline LOB has been accessed and the number of times the page in which the inline LOB is located has been accessed over a period of time.

10. The computer program product of claim 9, further comprising:
a seventh program instruction, stored on the computer readable storage medium, to determine whether the page activity of the inline LOB exceeds a predetermined threshold, and in response to determining that the page activity of the inline LOB does not exceed the predetermined threshold, redefining the length of the inline LOB to zero.

* * * * *